Nov. 15, 1927.

A. ALEXEEFF

WATER OR AIR MOTOR

Filed May 27, 1926

1,649,644

INVENTOR
ANDRE ALEXEEFF
BY H. H. Dyke
ATTORNEY

Patented Nov. 15, 1927.

1,649,644

UNITED STATES PATENT OFFICE.

ANDRÉ ALEXEEFF, OF PARIS, FRANCE.

WATER OR AIR MOTOR.

Application filed May 27, 1926. Serial No. 111,920.

My invention relates to a water or air motor for utilizing water or air currents as a source of power.

My improved motor is of the class of motors wherein pivoted buckets are supported to extend across the current in one part of their movement, and are free to turn during another return part of their movement.

According to my invention means are provided for securing increased power by excluding or substantially excluding the fluid current from the zone traversed by the buckets during their return movement.

In accordance with another feature of the invention means are provided for completely freeing the buckets so that the current does not exert driving pressure thereon at any time, whereby the motor can be turned off or, in other words, stopped, at will.

The above and further objects of my invention will be understood from the following description of a form of apparatus embodying the principle of the invention.

Figure 1:
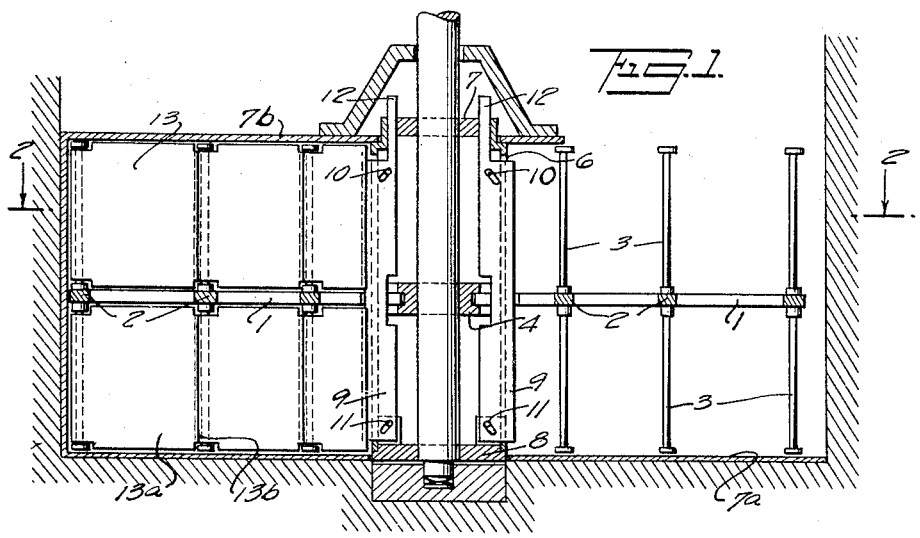
Figure 2:
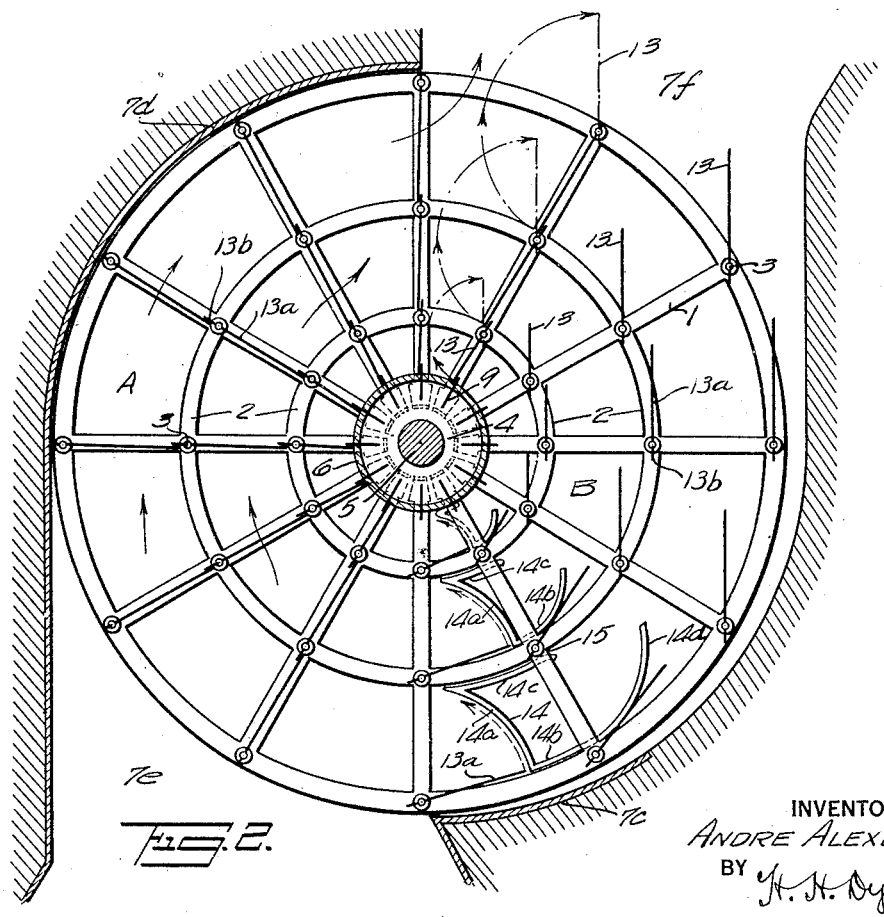

In the accompanying drawings, Fig. 1 is a vertical, central, sectional view. Fig. 2 is a section on the line 2—2, Fig. 1.

The motor comprises a wheel constructed preferably as an open framework and made up of radial spokes 1 and rings 2, connected at their intersections by the vertical rods 3. The spokes 1 are secured in a hub or housing 4 which turns on the central, vertical shaft 5. Said spokes 1 extend through a cylinder 6 provided with bushings 8 to rotate on shaft 5. The cylinder 6 is provided with a series of slitted openings in which the stop pieces 9 can move. Stop pieces 9 have inclined slots near each end through which the supporting pins 10 and 11 are passed and the upper ends 12 of stop pieces 9 extend through openings in the upper bushing 8 and project therebeyond. Upon depressing stop pieces 9 they project beyond cylinder 6, as shown in the drawings, and serve to limit the turning movement of the adjacent buckets 13. Upon raising the stop pieces 9, preferably in unison as by a suitable lever or the like, they are retracted into cylinder 6. In this position of stop pieces 9 the turning movement of buckets 13 is not limited by stop pieces 9 and the buckets 13 can turn freely.

The buckets 13 are normally free to revolve on the rods 3. Each of the buckets or doors 13 comprises a principal part $13^a$ of a size to occupy the space between two of the rods 3, 3 and a smaller part or tail piece $13^b$ extending on the opposite side of the rod 3 on which the bucket turns. Tail piece $13^b$ is adapted to serve as support for limiting the turning movement of the principal part $13^a$ of the adjacent door or bucket.

This framework wheel, which constitutes the rotating part of the machine, is enclosed in a casing 7. The casing has a floor $7^a$ and a cover $7^b$, and has the generally cylindrical side walls $7^c$ and $7^d$, which are interrupted at $7^e$ and $7^f$ to provide respectively an inlet and outlet for the fluid flowing in the direction of the arrows on Fig. 2.

In order to prevent power loss on the return movement of the buckets, I provide means for confining the current to the power zone A, traversed by the current from entry at $7^e$ to outlet at $7^f$, and for excluding the current from the return zone B.

In the form shown such means comprises the vertical partitions 14, 14 of generally U-form, made preferably of sheet material and comprising main parts $14^a$ and wing parts $14^b$, $14^c$. Parts $14^a$ are curved in section on an arc of a radius substantially equal to the length of the principal part $13^a$ of the bucket 13, which travels adjacent thereto, and the parts $14^b$ and $14^c$ extend into return zone B from each end of part $14^a$ and are curved on arcs substantially concentric with the rings 2. Each partition part $14^c$ is spaced away from the part $14^b$ of the neighboring partition structure 14 by an interval 15 sufficient to permit passage of the rod 3 and bucket 13 therethrough, but not sufficient to permit the fluid current to pass to any material extent into return zone B, from which it is substantially excluded by a partition wall made up of the partition members 14 and extending substantially from casing floor $7^a$ to the cover $7^b$. The parts $14^b$ of the U-shaped partition members 8 may be extended rearwardly and circularly for the whole or, preferably, for a part of their height, as indicated at $14^d$, in order to guide the returning buckets 13 into the spaces 15 between the parts 14 of the partition wall.

Operation is as follows: When the stop bars 9 are projected out from the cylinder 6 they are in position to be contacted by and afford a support for the tail piece $13^b$ of the neighboring doors or buckets 13. As the wheel turns and the buckets are returned to the power zone A through the openings 15 they turn on their pivots on rods 3. The innermost buckets 13 are held across the current by the stop bars 9 and all the other buckets in line on the same spoke are in turn held across the current by coming into contact with the tail pieces 13$^b$ on the next bucket of the series. The buckets being so supported during their travel through power zone A exert resistance to the current flow resulting in the desired development of power. When the buckets pass into return zone B they turn freely on their pivots and automatically assume the position of least resistance until they pass through openings 15 whereupon the cycle is repeated. As only still fluid is encountered in the return zone B the power used upon the return is reduced as compared with the power which would be wasted by returning the buckets and wheel frame against a current.

The machine may be set into operation by projecting the stop members 9 beyond their recesses in cylinder 6, or stopped by withdrawing same into the recesses whereupon the buckets 13 may turn freely at all times and no torque is developed.

For wind wheels the stops 9 are preferably fixed in their outwardly projected position and the apparatus stopped by closing the inlet opening in any suitable manner.

Modifications may be resorted to within the scope of my claims, as, for example, in large machines the number of spokes, rings and buckets may be increased according to power requirements, and spokes 1 and rings 2 may be provided at the ends of rods 3, as well as at the middle parts thereof so long as the proper movement of buckets 13 is not interfered with.

I claim:

1. In a fluid current motor, a casing having a fluid inlet and outlet, a wheel in said casing having stop members adjacent to its axis constructed to be projected or retracted at will, pivoted vanes on said wheel arranged to be held against pivotal turning under the influence of the current coming into contact with said stop members when the stop members are in projecting position, and means for excluding the current from the zone of return movement, said means comprising a series of partitions in said casing having narrow inlet openings and arranged adjacent the inlet to the casing and adapted to restrict the current flow to a substantially direct path from the casing inlet into the casing outlet, said vanes on their return being adapted to pass substantially edgewise through the openings in the partitions.

2. In a fluid current motor, a casing having a fluid inlet and outlet, a wheel in said casing and having a series of vanes pivoted adjacent one another, each vane in the series being provided with a tail-piece to hold the adjacent vane against turning on its pivot under the influence of the current when the innermost vane in the series is held against such pivotal turning movement, a plurality of pins disposed adjacent to the axis of said wheel, a plurality of stop members provided with inclined slots and constructed to oscillate on said pins, said stop members being arranged adjacent to the axis of said wheel and adapted to be projected or retracted at will, and means for excluding the current from the zone of return movement, said means comprising a series of partitions of generally U-form in said casing having narrow inlet openings, arranged adjacent the inlet to the casing and adapted to restrict the current flow to a substantially direct path from the casing inlet into the casing outlet, said vanes on their return being adapted to pass substantially edgewise through the openings in the partitions.

In testimony whereof, I have signed my name hereto.

ANDRÉ ALEXEEFF.

CERTIFICATE OF CORRECTION.

Patent No. 1,649,644.   Granted November 15, 1927, to

ANDRE ALEXEEFF.

It is hereby certified that error appears in the above numbered patent requiring correction as follows: In the drawing, figure 1, the upper bushing should be marked "8a" instead of "7"; in the printed specification, line 35, after the numeral "8" insert the words "and 8a"; and tha tthe said Letters Patent should be read with these corrections therein that the same may conform to the record of the case in the Patent Office.

Signed and sealed this 20th day of December, A. D. 1927.

Seal.
M. J. Moore,
Acting Commissioner of Patents.